(12) United States Patent
Ikeya et al.

(10) Patent No.: US 10,186,795 B2
(45) Date of Patent: Jan. 22, 2019

(54) ELECTRICAL CONTACT MEMBER, PLATED TERMINAL, TERMINAL-ATTACHED ELECTRICAL WIRE, AND WIRE HARNESS

(71) Applicant: Yazaki Corporation, Tokyo (JP)

(72) Inventors: Hayato Ikeya, Shizuoka (JP); Nobuyuki Tamura, Shizuoka (JP); Shinobu Kayama, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/007,224

(22) Filed: Jun. 13, 2018

(65) Prior Publication Data

US 2018/0366841 A1    Dec. 20, 2018

(30) Foreign Application Priority Data

Jun. 15, 2017  (JP) ................................. 2017-117424
Jun. 12, 2018  (JP) ................................. 2018-112031

(51) Int. Cl.
| | | |
|---|---|---|
| *H01R 13/03* | (2006.01) | |
| *H01R 4/60* | (2006.01) | |
| *H01B 1/02* | (2006.01) | |
| *H01B 7/00* | (2006.01) | |
| *H01R 4/18* | (2006.01) | |
| *C22C 5/06* | (2006.01) | |
| *B60R 16/02* | (2006.01) | |
| *H01R 4/62* | (2006.01) | |

(52) U.S. Cl.
CPC .............. *H01R 13/03* (2013.01); *C22C 5/06* (2013.01); *H01B 1/02* (2013.01); *H01B 7/0045* (2013.01); *H01R 4/185* (2013.01); *H01R 4/60* (2013.01); *B60R 16/0207* (2013.01); *H01R 4/62* (2013.01); *H01R 2201/26* (2013.01)

(58) Field of Classification Search
CPC ....................................................... H01R 13/03
See application file for complete search history.

(56) References Cited

U.S. PATENT DOCUMENTS

| | | | | |
|---|---|---|---|---|
| 6,099,713 A | * | 8/2000 | Yanada | ..................... C25D 3/60 106/1.23 |
| 2003/0186597 A1 | * | 10/2003 | Suzuki | ................... H01R 13/03 439/886 |
| 2016/0172069 A1 | * | 6/2016 | Sumiya | ..................... C22C 5/06 428/673 |
| 2017/0085012 A1 | * | 3/2017 | Kayama | ................. H01R 4/185 |
| 2017/0352972 A1 | * | 12/2017 | Kato | .................... B32B 15/018 |

(Continued)

FOREIGN PATENT DOCUMENTS

| | | |
|---|---|---|
| JP | 2009-079250 A | 4/2009 |
| JP | 2015-183216 A | 10/2015 |
| JP | 2016-152187 A | 8/2016 |

*Primary Examiner* — James Harvey
(74) *Attorney, Agent, or Firm* — Sughrue Mion, PLLC

(57) ABSTRACT

There is provided an electrical contact member including: a conductive base material; and an Ag—Sn alloy plated layer formed on the conductive base material, wherein the Ag—Sn alloy plated layer has a first Ag—Sn alloy plated layer having an Sn concentration of 5 to 38 at. % and a Vickers hardness of 100 or more Hv and less than 300 Hv and a second Ag—Sn alloy plated layer having a Vickers hardness higher than that of the first Ag—Sn alloy plated layer in this order from the outermost layer.

6 Claims, 3 Drawing Sheets

(56) References Cited

U.S. PATENT DOCUMENTS

2018/0026385 A1* 1/2018 Kato ..................... H01R 13/03
                                                      439/886
2018/0212350 A1* 7/2018 Tamura ................. H01R 13/03

* cited by examiner

ELECTRICAL CONTACT MEMBER, PLATED TERMINAL, TERMINAL-ATTACHED ELECTRICAL WIRE, AND WIRE HARNESS

CROSS-REFERENCE TO RELATED APPLICATIONS

This application is based upon and claims the benefit of priority from the prior Japanese Patent Application No. 2017-117424 (filed on Jun. 15, 2017) and 2018-112031 (filed on Jun. 12, 2018), the entire contents of which are incorporated herein by reference.

BACKGROUND OF THE INVENTION

1. Field of the Invention

The present invention relates to an electrical contact member, a plated terminal, a terminal-attached electrical wire, and a wire harness, which are used for wire harnesses and the like in automobiles.

2. Description of the Related Art

Recently, there is an increasing need for hybrid automobiles or electric automobiles. As different from the conventional gasoline automobiles, a high power motor is used in the hybrid and electric automobiles. A high electric current flows through the wiring and terminal of the motor, thereby increasing the heating value. Accordingly, in the case of tin plating (i.e., plating of the terminal) which has been used in the gasoline automobiles, the heat resistance may not be satisfied, and thus silver plating with a small heating value (small electric resistivity) is used. Further, since a charge connector used in the hybrid automobiles or electric automobiles is repeatedly inserted and removed, hard Ag plating in which the wear resistance is improved is used (e.g., refer to JP 2009-79250 A).

However, even in the case of hard Ag plating, the Vickers hardness is about 140 Hv. It is necessary to increase the thickness of plating to be durable for repetitive insertion and removal. This causes problems such as a reduction in productivity due to an increase in plating time and an increase in plating cost. Further, when the conventional hard Ag plating is exposed to a high-temperature environment, the plating hardness is decreased, thereby reducing the wear resistance.

In order to solve the above problems, for example, JP 2016-152187A discloses an Ag plated member in order to ensure the electrical contact reliability (to reduce the contact resistance on the surface) after being subjected to Ag—Sn plating having a higher hardness than that of Ag plating.

BRIEF SUMMARY OF THE INVENTION

However, in the case of the plating configuration described in JP 2016-152187A, the Ag plated layer is worn away and lost by repetitive insertion and removal. Consequently, there is a possibility that the electrical contact reliability is not ensured.

The present invention has been made in view of the problem of the conventional technology. An object of the present invention is to provide an electrical contact member excellent in wear resistance and electrical contact reliability, a plated terminal formed of the electrical contact member, a terminal-attached electrical wire including the plated terminal, and a wire harness including the terminal-attached electrical wire.

An electrical contact member according to a first embodiment of the present invention includes: a conductive base material; and an Ag—Sn alloy plated layer formed on the conductive base material, wherein the Ag—Sn alloy plated layer has a first Ag—Sn alloy plated layer having an Sn concentration of 5 to 38 at. % and a Vickers hardness of 100 or more Hv and less than 300 Hv and a second Ag—Sn alloy plated layer having a Vickers hardness higher than that of the first Ag—Sn alloy plated layer in this order from the outermost layer.

An electrical contact member according to a second embodiment of the present invention relates to the electrical contact member of the first embodiment, further comprising an Ni layer or an Ni alloy layer between the conductive base material and the second Ag—Sn alloy plated layer.

An electrical contact member according to a third embodiment of the present invention relates to the electrical contact member of the first or second embodiment, and the contact resistance in the first Ag—Sn alloy plated layer is lower than the contact resistance in the second Ag—Sn alloy plated layer.

A plated terminal according to a fourth embodiment of the present invention is composed of the electrical contact member of any one of the first to third embodiments.

A terminal-attached electrical wire according to a fifth embodiment of the present invention includes the plated terminal of the first embodiment.

A wire harness according to a sixth embodiment of the present invention includes the terminal-attached electrical wire of the first embodiment.

According to the present invention, it is possible to provide an electrical contact member excellent in wear resistance and electrical contact reliability, a plated terminal formed of the electrical contact member, a terminal-attached electrical wire including the plated terminal, and a wire harness including the terminal-attached electrical wire.

DETAILED DESCRIPTION OF THE INVENTION

Figure 1:
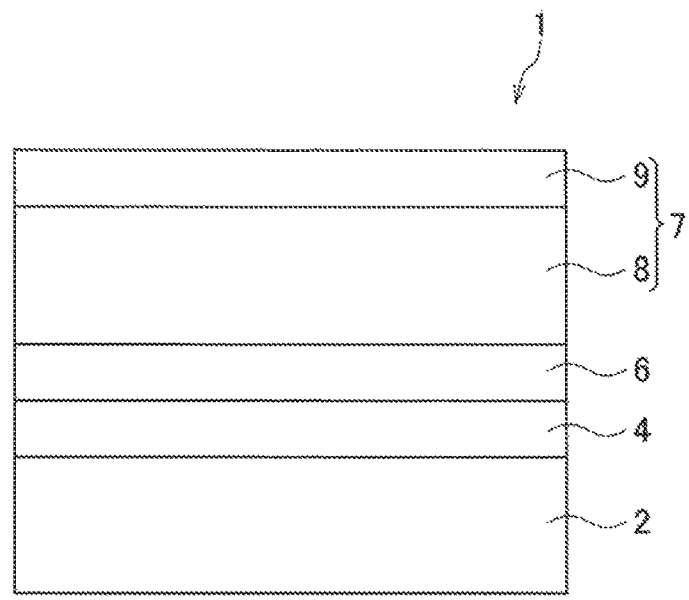
FIG. 1 is a pattern diagram illustrating a layer configuration of an electrical contact member of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Electrical Contact Member

The electrical contact member of the present embodiment is an electrical contact member having a conductive base material and an Ag—Sn alloy plated layer formed on the conductive base material. The Ag—Sn alloy plated layer has a first Ag—Sn alloy plated layer and a second Ag—Sn alloy plated layer in this order from the outermost layer. The first Ag—Sn alloy plated layer has an Sn concentration of 5 to 38 at. % and a Vickers hardness of 100 Hv or more and less than 300 Hv. Further, the Vickers hardness of the second Ag—Sn alloy plated layer is higher than that of the first Ag—Sn alloy plated layer.

The Vickers hardness can be measured in accordance with JIS Z2244:2009 (Vickers hardness test-test method). Further, the Vickers hardness can be measured at a test temperature of 25° C. with a test load of 5 gf.

FIG. 1 illustrates an example of the layer configuration of the electrical contact member of the present embodiment. Regarding an electrical contact member 1 illustrated in FIG. 1, an Ni layer 4, an Ag strike plated layer 6, and an Ag—Sn alloy plated layer 7 are formed in this order on a conductive base material 2. On the outermost layer of the Ag—Sn alloy plated layer 7, a first Ag—Sn alloy plated layer 9 having a Vickers hardness of 100 or more Hv and less than 300 Hv is formed. Below the first Ag—Sn alloy plated layer 9, a second Ag—Sn alloy plated layer 8 having a Vickers hardness higher than that of the first Ag—Sn alloy plated layer is formed. Hence, the second Ag—Sn alloy plated layer 8 having a hardness higher than that of the outermost layer is formed on the lower layer of the first Ag—Sn alloy plated layer 9 (i.e., the outermost layer), whereby the contact area of the contact portion is decreased, and further the plated layer having a hardness smaller than that of the lower layer is formed on the outermost surface, whereby the deforming stress is reduced. Therefore, it is possible to reduce the friction coefficient of the outermost layer and achieve an improvement in wear resistance. Even when the number of times of sliding is increased and the outermost layer is worn away, it is possible to ensure the wear resistance and electrical contact reliability because the second Ag—Sn alloy plated layer 8 (i.e., the lower layer of the outermost layer) has a hardness higher than that of the outermost layer and has the same contact resistance as that of the first Ag—Sn alloy plated layer.

Hereinafter, each of the layers will be sequentially described.

Conductive Base Material

The conductive base material is made of a material containing at least one selected from the group consisting of Cu, a Cu alloy, Al, an Al alloy, Mg, an Mg alloy, Fe, and an Fe alloy and is processed into a shape according to applications.

First Ag—Sn Alloy Plated Layer

The first Ag—Sn alloy plated layer has an Sn concentration of 5 to 38 at. % and a Vickers hardness of 100 Hv or more and less than 300 Hv, and is formed adjacent to the top of the second Ag—Sn alloy plated layer and located at the outermost surface. The Vickers hardness of the first Ag—Sn alloy plated layer is 100 Hv or more and less than 300 Hv. When the Vickers hardness is less than 100 Hv, it is not possible to ensure the wear resistance. When the Vickers hardness is 300 Hv or more, the hardness difference from the second Ag—Sn alloy plated layer becomes small, thereby the effect of improving the wear resistance due to the first and second Ag—Sn alloy plated layers cannot be obtained. The Vickers hardness of the first Ag—Sn alloy plated layer is preferably from 190 to 260 Hv and more preferably from 220 to 260 Hv.

Meanwhile, the first Ag—Sn alloy plated layer has an Sn concentration of 5 to 38 at. %, it is impossible to increase the hardness when the Sn concentration is less than 5 at. %, and it is impossible to increase the hardness even if the Sn concentration exceeds 38 at. %. The Sn concentration of the first Ag—Sn alloy plated layer is preferably from 10 to 25 at. %.

The thickness of the first Ag—Sn alloy plated layer is preferably from 0.1 to 30 μm and more preferably from 1.0 to 10 μm.

Second Ag—Sn Alloy Plated Layer

The second Ag—Sn alloy plated layer has a Vickers hardness higher than that of the first Ag—Sn alloy plated layer, and is formed on the conductive base material directly or via another layer. When the Vickers hardness of the second Ag—Sn alloy plated layer is lower than that of the first Ag—Sn alloy plated layer, it is not possible to ensure the wear resistance. A difference in Vickers hardness between the second Ag—Sn alloy plated layer and the first Ag—Sn alloy plated layer is preferably 50 Hv and more preferably 100 Hv. Further, the Vickers hardness of the second Ag—Sn alloy plated layer is preferably from 200 to 400 Hv and more preferably from 260 to 320 Hv. The Vickers hardness exceeds 400 Hv, whereby a crack of plating is caused during processing of the terminal.

Meanwhile, from the viewpoint of the fact that the Vickers hardness of the second Ag—Sn alloy plated layer is higher than that of the first Ag—Sn alloy plated layer, the Sn concentration is preferably from 18 to 31 at. %.

The thickness of the second Ag—Sn alloy plated layer is preferably from 1.0 to 30 μm and more preferably from 5.0 to 20 μm.

Regarding the first and second Ag—Sn alloy plated layers, in order to ensure the electrical contact reliability, the contact resistance in the first Ag—Sn alloy plated layer is preferably lower than the contact resistance in the second Ag—Sn alloy plated layer.

Ni Layer/Ni Alloy Layer

The Ni layer is a layer which is formed as needed. Although the Ni layer 4 is illustrated in FIG. 1, the Ni alloy layer may be used in place of the Ni layer. In the embodiment illustrated in FIG. 1, the Ni layer 4 is arranged between the conductive base material 2 and the Ag strike plated layers 6. In this case, the Ni layer 4 functions as an underlayer of the Ag strike plated layer 6 and suppresses the diffusion of the element formed of the conductive base material in the Ag strike plated layer 6, whereby it is possible to improve the contact reliability and heat resistance.

The thickness of the Ni layer 4 is preferably from 0.1 to 3.0 μm and more preferably from 0.1 to 1.0 μm. Note that, in place of the Ni layer 4 or in addition to the Ni layer 4, another layer may be added according to the application purpose.

Ag Strike Plated Layer

The Ag strike plated layer is formed as needed, similarly to the Ni layer. In the embodiment illustrated in FIG. 1, the Ag strike plated layer 6 is arranged between the Ni layer 4 and the second Ag—Sn alloy plated layer 8. In the electrical contact member 1 of the present embodiment, the Ag strike plated layer 6 functions as an underlayer of the second Ag—Sn alloy plated layer 8, whereby the adhesion of the second Ag—Sn alloy plated layer 8 to the conductive base material 2 or the Ni layer 4 can be improved. The thickness of the Ag strike plated layer 6 is preferably from 0.1 to 1.5 μm and more preferably from 0.1 to 1.0 μm. Note that, in place of the Ag strike plated layer 6 or in addition to the Ag strike plated layer 6, another layer may be added according to the application purpose.

Method of Producing Electrical Contact Member

The method of producing an electrical contact member of the present embodiment is a method of producing the electrical contact member of the present embodiment as described above. The method includes a step of continuously performing electroplating using a single plating bath containing Ag ions and Sn ions while controlling the currant density and forming a first Ag—Sn alloy plated layer and a second Ag—Sn alloy plated layer. Here, the term "continuously" does not only mean that the second Ag—Sn alloy plated layer is formed and then the first Ag—Sn alloy plated layer is continuously formed. The term also means that the second Ag—Sn alloy plated layer is formed and then the first Ag—Sn alloy plated layer is formed after the downtime. In other words, the first and second Ag—Sn alloy plated layers are formed by controlling the current density without changing the single plating bath. Therefore, it is not necessary to separately provide a plating bath for forming the first and second Ag—Sn alloy plated layers so that it is possible to achieve an improvement in production efficiency. In other words, in spite of forming two plated layers, only the single plating bath may be provided, which contributes to the production efficiency.

In production of the electrical contact member of the present embodiment, the conductive base material is provided, and the Ni layer, the Ag strike plated layer, and the like are formed as needed. Thereafter, the second Ag—Sn alloy plated layer and the first Ag—Sn alloy plated layer are formed in this order.

The first and second Ag—Sn alloy plated layers can be formed by, for example, adding a tin salt to a silver plating bath to prepare a silver tin alloy-plating bath and immersion plating a conductive base material in the silver tin alloy-plating bath. In the case of constant current electrolysis (plating), it is easy to control the film thickness and thus this is preferred.

The silver tin plating bath used for forming the first and second Ag—Sn alloy plated layers may include, for example, a silver salt, a tin salt, a conducting salt, a brightener. Examples of materials used for the silver salt include silver cyanide, silver iodide, silver oxide, silver sulfate, silver nitrate, and silver chloride. Examples of the conducting salt include potassium cyanide, sodium cyanide, potassium pyrophosphate, potassium iodide, and sodium thiosulfate. Examples of the brightener include metal brighteners (such as antimony, selenium, and tellurium) and organic brighteners (such as benzenesulfonic acid and mercaptan).

Examples of materials used for the tin salt of the silver tin plating bath include organic stannous sulfonate such as stannous methanesulfonate; stannous salts such as stannous pyrophosphate, stannous chloride, stannous sulfate, stannous acetate, stannous sulfamate, stannous gluconate, stannous tartrate, stannous oxide, stannous borofluoride, stannous succinate, stannous lactate, stannous citrate, stannous phosphate, stannous iodide, stannous formate, stannous fluorosilicate; and stannic salts such as sodium stannate and potassium stannate.

In the method of producing an electrical contact member of the present embodiment, when forming the first and second Ag—Sn alloy plated layer, electroplating is continuously performed using a single silver tin plating bath while controlling the current density. In other words, when the second Ag—Sn alloy plated layer is formed at a predetermined current density so as to have a desired thickness within the above-described preferable range, the current density is changed to a current density for forming the first Ag—Sn alloy plated layer, and then electroplating is continuously performed. When the first Ag—Sn alloy plated layer having a desired thickness within the above-described preferable range is formed, the electroplating is finished.

The second Ag—Sn alloy plated layer is formed, preferably at a current density of 0.1 to 20 A/dm$^2$, more preferably at a current density of 1.0 to 5.0 A/dm$^2$. The current density when forming the first Ag—Sn alloy plated layer after forming the second Ag—Sn alloy plated layer is preferably from 0.1 to 20 A/dm$^2$, and more preferably from 1.0 to 10 A/dm$^2$. The plating bath temperature when electroplating the first and second Ag—Sn alloy plated layers is preferably from 0 to 60° C. and more preferably from 20 to 40° C. The plating bath temperature is set to the above range so that it is possible to effectively form the first and second Ag—Sn alloy plated layers by complex effects. When a downtime is provided between the end of formation of the second Ag—Sn alloy plated layer and the beginning of formation of the first Ag—Sn alloy plated layer, the downtime is preferably set to the range of from 1 to 60 minutes.

As described above, in the production method of the present embodiment, the formation of the first and second Ag—Sn alloy plated layers is completed by successive plating steps so that it is possible to form the layers without increasing the process cost.

The method of forming an Ni layer and the method of forming an Ag strike plated layer will be described below.

The method of forming an Ni layer is not particularly limited, and a conductive base material is added to a nickel plating bath and then the material can be plated by any known plating method.

The nickel plating bath may contain, for example, a nickel salt, a buffer for pH, and a brightener. Examples of materials used for the nickel salt include nickel sulfate, nickel chloride, and nickel sulfamate. Examples of the buffer for pH include boric acid, citric acid, and nickel acetate. Examples of the brightener include sulfamate, saccharin, sulfonamide, sulfinic acid, naphthalene, sodium naphthalenesulfonate, and nickel acetate.

The current density when electroplating the Ni layer is preferably from 2.0 to 15.0 A/dm$^2$ and more preferably from 2.0 to 10.0 A/dm². When electroplating the Ni layer, the temperature of the electroplating bath is preferably from 45 to 65° C. The plating bath temperature is set to the above range so that it is possible to perform nickel plating at a high current density and thus this is preferred.

Meanwhile, the method of forming an Ag strike plated layer is not particularly limited, and a conductive base material or an Ni layer containing conductive base material is added to an Ag strike plating bath and then the material can be plated by any known plating method.

The Ag strike plating bath may contain, for example, a silver salt, a conducting salt, and a brightener. Examples of materials used for the silver salt include silver cyanide, silver iodide, silver oxide, silver sulfate, silver nitrate, and silver chloride. Examples of the conducting salt include potassium cyanide, sodium cyanide, potassium pyrophosphate, potassium iodide, and sodium thiosulfate. Examples of the brightener include metal brighteners (such as antimony, selenium, and tellurium), benzenesulfonic acid, and mercaptan.

The current density when electroplating the Ag strike plated layer is preferably 1.6 A/dm² or more and more preferably 2.0 A/dm² or more. The upper limit of the current density is set taking into consideration various factors such as productivity, plating bath composition, ion concentration, and shape of plated product. When electroplating the Ag strike plated layer, the temperature of the electroplating bath is preferably from 20 to 30° C. The plating bath temperature is set to the above range so that it is possible to reduce the possibility of generation of burnt deposits.

Plated Terminal

The plated terminal of the present embodiment is formed of the above electrical contact member. Thus, the plated terminal of the present embodiment has a high wear resistance, a low surface contact resistance, and a high electrical contact reliability as compared to the conventional silver or silver alloy plated terminal. The plated terminal of the present embodiment is used for the terminal-attached electrical wire, and an example thereof will be shown in the following terminal-attached electrical wire.

Terminal-Attached Electrical Wire

Figure 2:
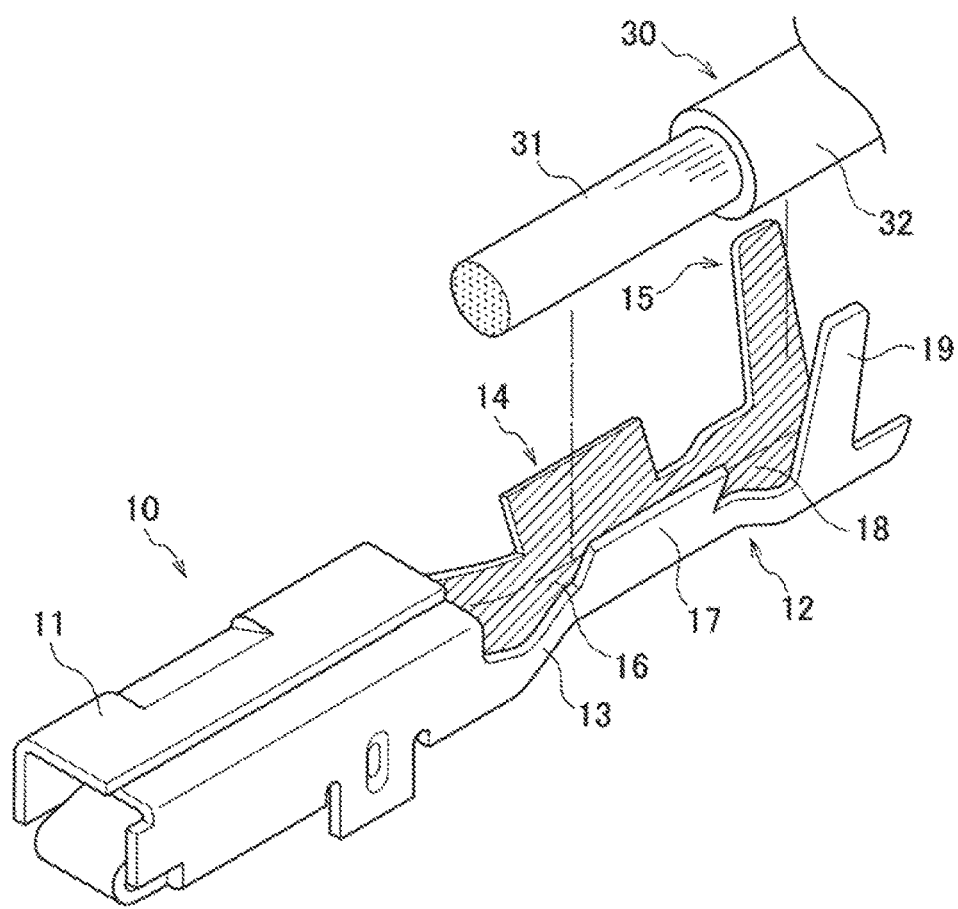
FIG. 2 is a perspective view illustrating an example of a terminal-attached electrical wire according to the present embodiment before pressure-bonding of the electrical wire with the terminal.
Figure 3:
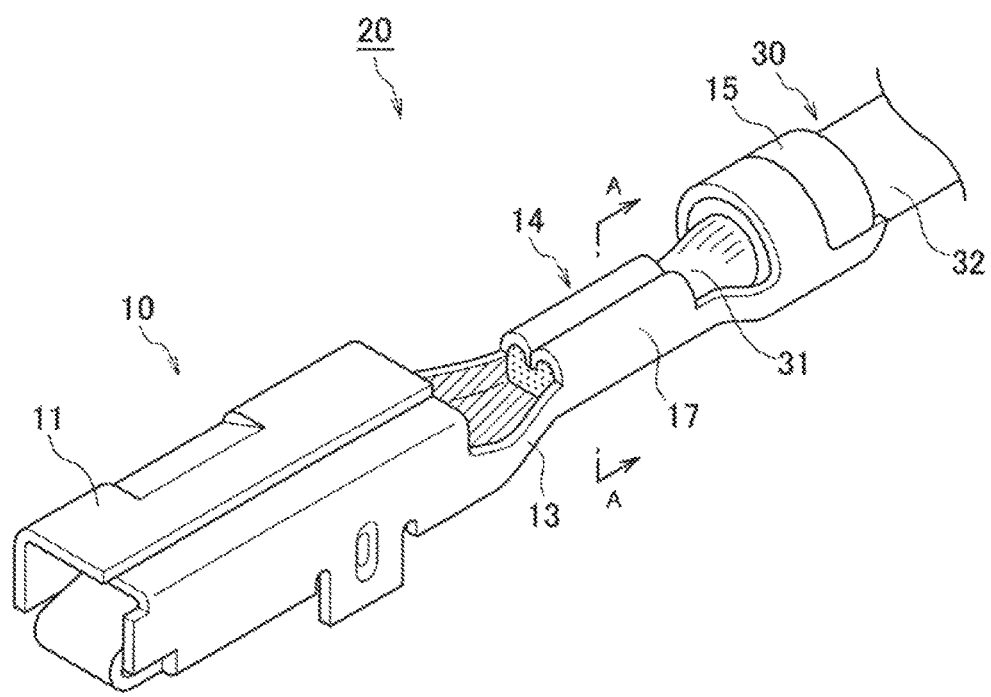
FIG. 3 is a perspective view illustrating an example of the terminal-attached electrical wire according to the present embodiment after pressure-bonding of the electrical wire with the terminal.
Figure 4:
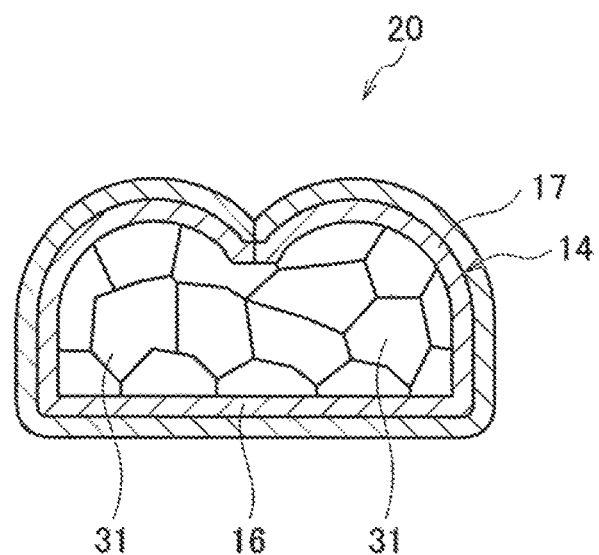
FIG. 4 is a cross-sectional view in an A-A line of FIG. 3.

The terminal-attached electrical wire of the present embodiment includes the plated terminal of the present embodiment. Hereinafter, the terminal-attached electrical wire will be described with reference to the drawings. As illustrated in FIGS. 2 to 4, a terminal-attached electrical wire 20 of the present embodiment includes a terminal (plated terminal) 10. Specifically, the terminal-attached electrical wire 20 of the present embodiment includes a conductor 31, an electrical wire 30 having a wire coating material 32 which coats the conductor 31, and a terminal 10 which is connected to the conductor 31 of the electrical wire 30 and is formed of a plating material for terminal. The terminal 10 is the plated terminal of the present embodiment as described above and is formed so as to have at least the second Ag—Sn alloy plated layer and the first Ag—Sn alloy plated layer on the surface of a conductive base material. Note that FIG. 2 illustrates a state before the electrical wire is pressure-bonded with the terminal, and FIG. 3 illustrates a state after the electrical wire is pressure-bonded with the terminal. Further, FIG. 4 illustrates a cross-sectional view along an A-A line of FIG. 3.

The terminal 10 illustrated in FIG. 2 is a female type crimping terminal. The terminal 10 has an electrical connection portion 11 which is connected to a mating terminal (not illustrated). The electrical connection portion 11 has a box-like shape and includes a spring piece which engages with the mating terminal. Further, in the terminal 10, an electrical wire connection portion 12, which is connected by caulking the end portion of the electrical wire 30, is formed at the opposite side of the electrical connection portion 11. The electrical connection portion 11 and the electrical wire connection portion 12 are connected via a connection portion 13. Note that although the electrical connection portion 11, the electrical wire connection portion 12, and the connection portion 13 are formed of the same materials and integrally constitute the terminal 10, a name is conveniently given to each site.

The electrical wire connection portion 12 includes a conductor crimping portion 14 which caulks the conductor 31 of the electrical wire 30 and a coating material caulking portion 15 which caulks the wire coating material 32 of the electrical wire 30.

The conductor crimping portion 14 directly contacts with the conductor 31 which is removed from the wire coating material 32 of the end portion of the electrical wire 30 and exposed, and has a base plate portion 16 and a pair of conductor caulking pieces 17. The pair of conductor caulking pieces 17 is extended upward from the both side edges of the base plate portion 16. The pair of conductor caulking pieces 17 is inwardly bent to wrap the conductor 31 of the electrical wire 30, whereby the conductor 31 is caulked so as to be firmly attached to the top surface of the base plate portion 16. The conductor crimping portion 14 is formed in an approximately U-shape in a cross sectional view by the base plate portion 16 and the pair of conductor caulking pieces 17.

The coating material caulking portion 15 directly contacts with the wire coating material 32 of the end portion of the electrical wire 30 and has a base plate portion 18 and a pair of coating material caulking pieces 19. The pair of coating material caulking pieces 19 is extended upward from the both side edges of the base plate portion 18. The pair of coating material caulking pieces 19 is inwardly bent to wrap a portion to which the wire coating material 32 is attached, whereby the wire coating material 32 is caulked so as to be firmly attached to the top surface of the base plate portion 18. The coating material caulking portion 15 is formed in an approximately U-shape in a cross sectional view by the base plate portion 18 and the pair of coating material caulking pieces 19. Note that the base plate portion 16 of the conductor crimping portion 14 and the base plate portion 18 of the coating material caulking portion 15 are continuously formed as a common base plate portion.

The electrical wire 30 has the conductor 31 and the wire coating material 32 with which the conductor 31 is coated. As the material of the conductor 31, a highly conductive metal may be used. The material of the conductor 31 may be, for example, copper, a copper alloy, aluminum, an aluminum alloy or the like. Note that, recently, it is necessary to reduce the weight of the electrical wire. Accordingly, the conductor 31 is preferably made of light aluminum or an aluminum alloy.

As the material of the wire coating material 32 with which the conductor 31 is coated, a resin capable of ensuring electrical insulation may be used. As the material of the wire coating material 32, for example, an olefin-based resin may be used. Specifically, the material of the wire coating material 32 may contain at least one selected from the group consisting of polyethylene (PE), polypropylene (PP), an ethylenic copolymer, and a propylene copolymer as a main component. Further, the material of the wire coating material 32 may contain polyvinyl chloride (PVC) as the main component. Among them, polypropylene or polyvinyl chloride (as the main component) is preferably contained in the material of the wire coating material 32 from the viewpoints of high flexibility and durability. Note that the main component used herein means a component having 50% by mass or more of the whole wire coating material.

The terminal 10 can be connected to the electrical wire 30 by, for example, the following method. As illustrated in FIG. 2, the end portion of the electrical wire 30 is first inserted into the electrical wire connection portion 12 of the terminal 10. Thus, the conductor 31 of the electrical wire 30 is placed on the top surface of the base plate portion 16 of the conductor crimping portion 14, and the portion to which the wire coating material 32 of the electrical wire 30 is attached is placed on the top surface of the base plate portion 18 of the coating material caulking portion 15. Next, the conductor crimping portion 14 and the coating material caulking portion 15 are deformed by pressing the electrical wire connection portion 12 and the end portion of the electrical wire 30. Specifically, the pair of conductor caulking pieces 17 of the conductor crimping portion 14 is inwardly bent to wrap the conductor 31, whereby the conductor 31 is caulked so as to be firmly attached to the top surface of the base plate portion 16. Further, the pair of coating material caulking pieces 19 of the coating material caulking portion 15 is inwardly bent to wrap a portion to which the wire coating material 32 is attached, whereby the wire coating material 32 is caulked so as to be firmly attached to the top surface of the base plate portion 18. As a result, the terminal 10 can be connected to the electrical wire 30 by pressure-bonding as illustrated in FIGS. 3 and 4.

The terminal-attached electrical wire 20 of the present embodiment includes the plated terminal of the present embodiment as described above, i.e., the terminal 10. Thus, in the terminal-attached electrical wire 20 of the present embodiment, the wear resistance of the terminal 10 is high compared to the conventional silver or silver alloy plated terminal, thereby minimizing an increase in the contact resistance. Consequently, the terminal-attached electrical wire 20 of the present embodiment can be appropriately used in locations such as hybrid automobiles and electric automobiles.

Wire Harness

The wire harness of the present embodiment includes the terminal-attached electrical wire of the present embodiment as described above. Specifically, the wire harness of the present embodiment includes a connector 50 and the terminal-attached electrical wire 20 as illustrated in FIG. 5.

Figure 5:
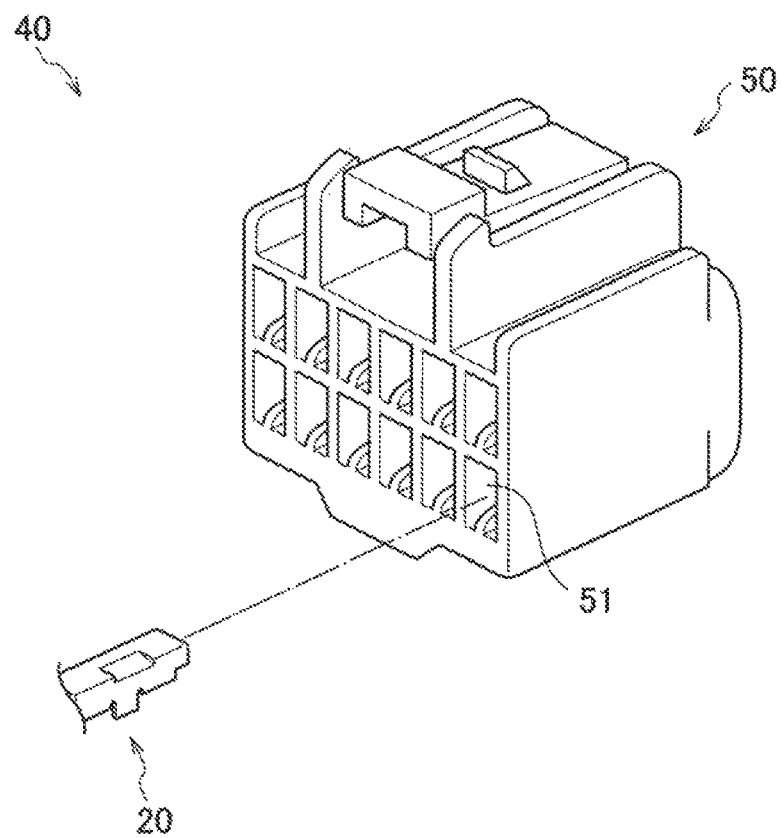
FIG. 5 is a perspective view illustrating an example of a wire harness according to the present embodiment.

In FIG. 5, a plurality of mating terminal mounting portions (not illustrated), on which a mating terminal (not illustrated) is mounted, is formed on the back surface of the connector 50. In FIG. 5, a plurality of cavities 51, on which the terminal 10 of the terminal-attached electrical wire 20 is mounted, is formed on the front surface of the connector 50. An approximately rectangular opening is formed in each of the cavities 51 so that the terminal 10 of the terminal-attached electrical wire 20 is mounted thereon. Further, the opening of each of the cavities 51 is formed into a size slightly larger than the cross section of the terminal 10 of the terminal-attached electrical wire 20. When the terminal 10 of the terminal-attached electrical wire 20 is mounted on each of the cavities 51 of the connector 50, the electrical wire 30 is drawn from the back surface of the connector 50.

The wire harness 40 of the present embodiment includes the terminal-attached electrical wire 20. Thus, in the wire harness 40 of the present embodiment, the wear resistance of the terminal 10 is high compared to the conventional silver or silver alloy plated terminal, thereby minimizing an increase in the contact resistance. Consequently, the wire harness 40 of the present embodiment can be appropriately used in locations such as hybrid automobiles and electric automobiles.

Hereinafter, the present invention will be described in more detail with reference to specific examples, however the present invention is not limited to these examples.

Reference Examples 1 to 12, Reference Comparative Examples 1 to 3

A C-1020 material was used as the conductive base material, and an alloy-plating bath having an Ag ion concentration of 5% by mass and an Sn ion concentration of 2% by mass was used as the plating bath. After pretreatment of the conductive base material as the plating material, the Ag strike plated layer and the Ag—Sn alloy plated layer were plated in this order. Note that the Ag—Sn alloy plating forming conditions (current density and plating time) are as shown in Table 1 and Table 2. The plating time was adjusted so that the thickness was 5 μm. Note that, in Table 1 and Table 2, the "Ag-26Sn" showing the composition of the coated layer means that the Sn concentration is 26 at. %.

Evaluation (1) Composition of Coated Layer

The composition of the Ag—Sn alloy plated layer was confirmed by analyzing the obtained test samples using energy dispersive x-ray spectroscopy (EDX) with a scanning electron microscope (SEM). The analysis results are shown in Table 1 and Table 2.

(2) Vickers Hardness

The Vickers hardness was measured at 25° C. with a load of 3 gf using a microhardness tester (DUH-211, manufactured by Shimadzu Corporation.). The measurement results are shown in Table 1 and Table 2.

(3) Contact Resistance

The value obtained by applying a contact load of 2 N using an electrical contact simulator (manufactured by Yamasaki-Seiki Co., Ltd.) was defined as a contact resistance value. The results are shown in Table 1 and Table 2.

(4) Wear Resistance

The wear resistance was evaluated by the sliding test. A sliding tester (CRS-B1050, manufactured by Yamasaki-Seiki Co., Ltd.) was used for the sliding test. The sliding test was performed at a sliding distance of 5 mm and a sliding speed of 3 mm/s with a low load of 2 N. Note that an indent shape has a radius R of 1 mm. After taking into consideration the productivity and cost, the wear resistance was evaluated in the following criteria: Good: the wear depth after 200 sliding cycles=5 μm or less; and Bad: the wear depth after 200 sliding cycles=greater than 5 μm. The evaluation results are shown in Table 1 and Table 2.

TABLE 1

|  | Reference Example 1 | Reference Example 2 | Reference Example 3 | Reference Example 4 | Reference Example 5 | Reference Example 6 |
| --- | --- | --- | --- | --- | --- | --- |
| Current density($A/dm^2$) | 0.50 | 1.00 | 1.50 | 1.50 | 2.00 | 2.00 |
| Composition of the coated layer (at %) | Ag—5.5Sn | Ag—18.2Sn | Ag—20.0Sn | Ag—21.8Sn | Ag—23.6Sn | Ag—27.3Sn |
| Vickers hardness(Hv) | 120 | 280 | 300 | 280 | 300 | 330 |
| Contact resistance(mΩ) | 0.3 | 1.2 | 1.1 | 0.8 | 0.8 | 0.7 |
| Wear resistance | ○ | ○ | ○ | ○ | ○ | ○ |

|  | Reference Example 7 | Reference Example 8 | Reference Example 9 | Reference Example 10 | Reference Example 11 | Reference Example 12 |
| --- | --- | --- | --- | --- | --- | --- |
| Current density($A/dm^2$) | 2.50 | 3.50 | 3.00 | 2.00 | 2.50 | 3.00 |
| Composition of the coated layer (at %) | Ag—28.3Sn | Ag—30.4Sn | Ag—31.3Sn | Ag—32.6Sn | Ag—34.1Sn | Ag—37.0Sn |
| Vickers hardness(Hv) | 332 | 268 | 282 | 211 | 216 | 170 |
| Contact resistance(mΩ) | 1 | 0.8 | 0.7 | 0.6 | 0.7 | 0.6 |
| Wear resistance | ○ | ○ | ○ | X | X | X |

TABLE 2

|  | Reference Comparative Example 1 | Reference Comparative Example 2 | Reference Comparative Example 3 |
| --- | --- | --- | --- |
| Current density ($A/dm^2$) | 3.00 | 1.20 | 10 |
| Composition of the coated layer (at %) | Ag—38Sn | Ag—1Sb | Ag |
| Vickers hardness (Hv) | 170 | 180 | 100 |
| Contact resistance (mΩ) | 1 | 0.9 | 0.6 |
| Wear resistance | x | x | x |

Table 1 and Table 2 show that the changing of the current density results in formation of Ag—Sn alloy plated layers having different composition, different Vickers hardness, and different contact resistance.

In each example, as shown in Table 3, a first Ag—Sn alloy plated layer and a second Ag—Sn alloy plated layer were formed in the same manner as in any of Reference Examples 1 to 12. Then, the wear resistance test described above was conducted and evaluated. The results are shown in Table 3.

TABLE 3

|  | Example 1 | Example 2 | Example 3 | Example 4 | Example 5 | Example 6 |
| --- | --- | --- | --- | --- | --- | --- |
| First Ag—Sn alloy plated layer plating thickness; 1 μm | Reference Example 12 | Reference Example 10 | Reference Example 12 | Reference Example 1 | Reference Example 9 | Reference Example 1 |
| Second Ag—Sn alloy plated layer plating thickness; 1 μm | Reference Example 5 | Reference Example 7 | Reference Example 7 | Reference Example 4 | Reference Example 6 | Reference Example 2 |
| Wear Resistance | ○ | ○ | ○ | ○ | ○ | ○ |

Table 3 shows the following fact. First, a second Ag—Sn alloy plated layer having a Vickers hardness higher than that of the first Ag—Sn alloy plated layer is formed at a predetermined current density. Then, the current density is changed so that it is possible to form a first Ag—Sn alloy plated layer having an Sn concentration of 5 to 38 at. % and a Vickers hardness of 100 or more Hv and less than 300 Hv. Eventually, an electrical contact member having excellent wear resistance and electrical contact reliability is obtained.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

The invention claimed is:

1. An electrical contact member comprising:
   a conductive base material; and
   an Ag—Sn alloy plated layer formed on the conductive base material, wherein
   the Ag—Sn alloy plated layer has a first Ag—Sn alloy plated layer having an Sn concentration of 5 to 38 at. % and a Vickers hardness of 100 or more Hv and less than 300 Hv and a second Ag—Sn alloy plated layer having a Vickers hardness higher than that of the first Ag—Sn alloy plated layer in this order from the outermost layer.

2. The electrical contact member according to claim 1, further comprising an Ni layer or an Ni alloy layer between the conductive base material and the second Ag—Sn alloy plated layer.

3. The electrical contact member according to claim 1, wherein the contact resistance in the first Ag—Sn alloy plated layer is lower than the contact resistance in the second Ag—Sn alloy plated layer.

4. A plated terminal which is formed of the electrical contact member according to claim 1.

5. A terminal-attached electrical wire comprising the plated terminal according to claim 4.

6. A wire harness comprising the terminal-attached electrical wire according to claim 5.

* * * * *